United States Patent
Li et al.

(10) Patent No.: US 10,346,467 B2
(45) Date of Patent: *Jul. 9, 2019

(54) METHODS, SYSTEMS, AND PRODUCTS FOR RECALLING AND RETRIEVING DOCUMENTARY EVIDENCE

(71) Applicant: AT&T Intellectual Property I, L.P., Atlanta, GA (US)

(72) Inventors: Kevin A. Li, New York, NY (US); Troy C. Meuninck, Newnan, GA (US); Robert Raymond Miller, II, Convent Station, NJ (US); James H. Pratt, Round Rock, TX (US); Horst J. Schroeter, New Providence, NJ (US); Behzad Shahraray, Holmdel, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/411,970

(22) Filed: Jan. 21, 2017

(65) Prior Publication Data
US 2017/0132254 A1 May 11, 2017

Related U.S. Application Data

(63) Continuation of application No. 14/797,137, filed on Jul. 12, 2015, now Pat. No. 9,575,997, which is a (Continued)

(51) Int. Cl.
*G06F 17/30* (2006.01)
*G06F 16/58* (2019.01)
(Continued)

(52) U.S. Cl.
CPC .......... *G06F 16/5866* (2019.01); *G06F 16/73* (2019.01); *G06F 16/93* (2019.01); *G06F 16/951* (2019.01)

(58) Field of Classification Search
CPC ......... G06F 17/30268; G06F 17/30011; G06F 17/30864; G06F 17/30823; G06F 16/5866; G06F 16/951; G06F 16/73; G06F 16/93; H04N 1/00127; H04N 1/32144; H04N 1/00037; H04N 2201/04789
(Continued)

(56) References Cited

U.S. PATENT DOCUMENTS 5,425,102 A 6/1995 Moy
6,611,841 B1 8/2003 Han
(Continued)

*Primary Examiner* — Greta L Robinson
(74) *Attorney, Agent, or Firm* — Scott P. Zimmerman, PLLC

(57) ABSTRACT

Methods, systems, and products help users recall memories and search for content of those memories. When a user cannot recall a memory, the user is prompted with questions to help recall the memory. As the user answers the questions, a virtual recollection of the memory is synthesized from the answers to the questions. When the user is satisfied with the virtual recollection of the memory, a database of content may be searched for the virtual recollection of the memory. Video data, for example, may be retrieved that matches the virtual recollection of the memory. The video data is thus historical data documenting past events.

20 Claims, 20 Drawing Sheets

Related U.S. Application Data continuation of application No. 13/693,070, filed on Dec. 4, 2012, now Pat. No. 9,110,989.

(51) Int. Cl.
  *G06F 16/73* (2019.01)
  *G06F 16/93* (2019.01)
  *G06F 16/951* (2019.01)

(58) Field of Classification Search
  USPC ....... 707/609, 640, 748, 653, 661, 672, 673, 707/674, 680, 686, 687, 693, 69, 6, 721, 707/736, 751, 756, 766, 768, 771, 781, 707/912, 913, 914, 915, 9, 16, 942, 767, 707/769; 713/156, 160, 161, 165, 167, 713/170, 173; 709/206, 207, 213
  See application file for complete search history.

(56) References Cited

U.S. PATENT DOCUMENTS

| | | | |
|---|---|---|---|
| 6,760,752 B1 | 7/2004 | Liu et al. | |
| 7,099,919 B2 | 8/2006 | Kusumoto | |
| 7,124,149 B2 | 10/2006 | Smith et al. | |
| 7,333,963 B2 | 2/2008 | Widrow et al. | |
| 7,610,306 B2 | 10/2009 | Lin et al. | |
| 7,756,845 B2 | 7/2010 | Madani | |
| 7,882,069 B2 | 2/2011 | Glover et al. | |
| 7,945,576 B2 | 5/2011 | Brown et al. | |
| 7,966,316 B2 | 6/2011 | Cao et al. | |
| 8,060,227 B2 | 11/2011 | Stefik | |
| 8,131,972 B2 * | 3/2012 | Burnett | G06F 12/023 707/693 |
| 8,136,028 B1 | 3/2012 | Loeb | |
| 2008/0259155 A1 | 10/2008 | McLelland et al. | |
| 2009/0240668 A1 * | 9/2009 | Li | G06F 17/30277 |
| 2010/0070501 A1 * | 3/2010 | Walsh | G06Q 10/10 707/736 |
| 2010/0318532 A1 | 12/2010 | Sznajder et al. | |
| 2011/0029552 A1 * | 2/2011 | Whitby | G06T 11/60 707/769 |
| 2011/0145196 A1 | 6/2011 | Bender | |
| 2011/0191838 A1 | 8/2011 | Yanagihara | |
| 2011/0302206 A1 | 12/2011 | Lipson et al. | |
| 2011/0314049 A1 | 12/2011 | Poirier et al. | |
| 2012/0154633 A1 | 6/2012 | Rodriguez | |
| 2012/0158716 A1 | 6/2012 | Zwol et al. | |
| 2012/0158717 A1 | 6/2012 | Unay et al. | |
| 2012/0203752 A1 | 8/2012 | Ha-Thuc et al. | |
| 2012/0233198 A1 | 9/2012 | Lanier et al. | |
| 2013/0031057 A1 | 1/2013 | Vakili | |

* cited by examiner

METHODS, SYSTEMS, AND PRODUCTS FOR RECALLING AND RETRIEVING DOCUMENTARY EVIDENCE

CROSS-REFERENCE TO RELATED APPLICATIONS

This application is a continuation of U.S. application Ser. No. 14/797,137 filed Jul. 12, 2015 and since issued as U.S. Pat. No. 9,575,997, which is a continuation of U.S. application Ser. No. 13/693,070 filed Dec. 4, 2012 and since issued as U.S. Pat. No. 9,110,989, with both applications incorporated herein by reference in their entireties.

BACKGROUND

Memory sometimes fails us. Sometimes we cannot remember details of life's events. Indeed, as memory loss and aging affect us all, people will embrace concepts that help us recall memories.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
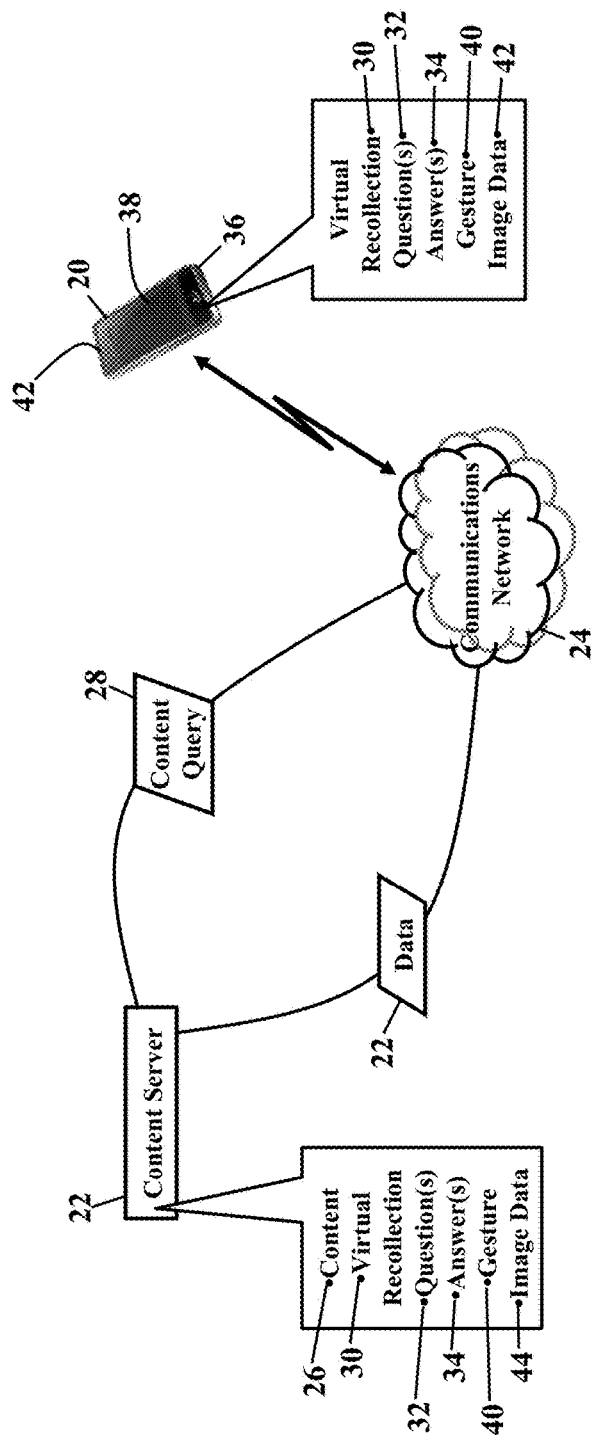
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a client device 20 that communicates with a content server 22 via a communications network 24. The content server 22 stores content 26 associated with a user of the client device 20. The content server 22, for example, may store digital photos, videos, audio, and any other data. As traffic cameras, household cameras, and mobile devices proliferate, our daily lives will be digitally documented and stored in the content server 22. When the user of the client device 20 wishes to retrieve some content 26 documenting a personal event, the user's client device 20 submits a content query 28 to the content server 22. The content server 22 retrieves the content 26 matching the content query 28.

Sometimes, though, content searches are fruitless. As the content server 22 accumulates the content 26, the content server 22 may store hundreds, perhaps thousands, of hours of video and audio data. Much of the content 26 may be time-stamped, so queries by date and time are easily retrieved. Unfortunately, though, many times we cannot accurately remember the date and time of some archived event we wish to retrieve. As most readers will understand, sometimes we can only remember fuzzy details. If the user cannot recall a date and time, the user must wade through hours of the content 26 to find archival video and audio of some personal event. Time is thus wasted trying to find documentary content 26, and the content server's processing and memory resources are unnecessarily consumed.

Exemplary embodiments, instead, construct a virtual recollection 30. If the user wishes to retrieve documentary evidence of some fuzzy memory, exemplary embodiments help the user build the virtual recollection 30 of her mental memory. That is, when the user of the client device 20 wishes to retrieve video, audio, and/or images of some moment, exemplary embodiments synthesize the virtual recollection 30 of any event. Because the user can only recall fuzzy details of the event, the user is prompted with questions 32 to help restore her mental memory. The user, for example, may be asked "were you drinking coffee at the beach?" "Was it raining?" "Were you alone or with others?" As the user inputs her answers 34 to the questions 32, the virtual recollection 30 of the mental memory is synthesized. If she was drinking coffee, as an example, then perhaps the virtual recollection 30 is changed to illustrate a coffee cup. If the user confirms the beach, then the virtual recollection 30 may be modified to illustrate sand, the ocean, and perhaps seagulls. If other people were present, the virtual recollection 30 may display faces of family and friends. FIG. 1, for simplicity, illustrates the client device 20 as the user's smart phone 36, thus allowing the questions 32 to be visually presented on a touch screen 38. The user may also type her answers 34 on the touch screen 38. As the user inputs her answers 34 to the questions 32, the virtual recollection 30 may be presented on the touch screen 38, such that each answer 34 may provide iterative, visual feedback for further refining the virtual recollection 30 of the mental memory. As the details combine, the virtual recollection 30 may help further jog the user's mental memory.

The virtual recollection 30 may even include gestures 40. Sometimes the user may remember a physical action or movement associated with the mental memory. Tipping a cup of coffee, for example, or throwing a pitch, may be a memorable, physical gesture 40 that helps jog the user's mental memory. Exemplary embodiments, then, may also permit the user to input any gesture 40 to further refine the virtual recollection 30. The user's smart phone 36, for example, may use its camera 42 to capture image data 44 of the gesture 40. The image data 44 may be a still photo or video. Regardless, the image data 44 may be incorporated into the virtual recollection 30 of the user's mental memory.

The virtual recollection 30 thus helps jog the user's memory. As the user continues answering the questions 32, exemplary embodiments recreate the virtual recollection 30 of the user's mental memory. Whatever details the user can recall, exemplary embodiments may refine the virtual recollection 30 to include those details. Furniture, landscape, and pets are only some details that may be incorporated into the virtual recollection 30 of the user's mental memory. Indeed, objects, colors, sights, sounds, and even smells may be synthesized into the virtual recollection 30. Whatever details the user can recall, those details may be combined to form a virtual scene that approximates the user's actual memory.

The virtual recollection 30 helps retrieve documentary evidence. Once the user is satisfied with the detail in the virtual recollection 30 of the user's mental memory, the user's client device 20 submits the content query 28 to the content server 22. Here, though, the content query 28 may specify the virtual recollection 30. When the content server 22 receives the content query 28, the content server 22 retrieves video, audio, and any other content 26 that matches the virtual recollection 30 of the user's mental memory. The content server 22 thus retrieves any content 26 that matches a computer generated virtual recollection 30. The matching content 26 may be sent to the client device 20, thus allowing the user to review actual video that documents some fuzzy memory.

Exemplary embodiments thus provide an alternative to conventional content-based searches. Conventional search techniques may utilize annotated text to retrieve the matching content 26. Other conventional search techniques may utilize a query image to retrieve the matching content 26. Many times, though, memories are fuzzy, for which conventional search techniques produce large and impractical query results. Exemplary embodiments, instead, probe the user to recall details of memories. Indeed, one seemingly small, individual recalled detail may awaken or revive a flood of other details. These seemingly small, individual details may be combined or synthesized into a quite detailed virtual recollection 30 of the user's mental memory. Because the virtual recollection 30 includes more and finer details, exemplary embodiments produce more narrowed search results, thus reducing search times and conserving server processing resources.

Figure 2:
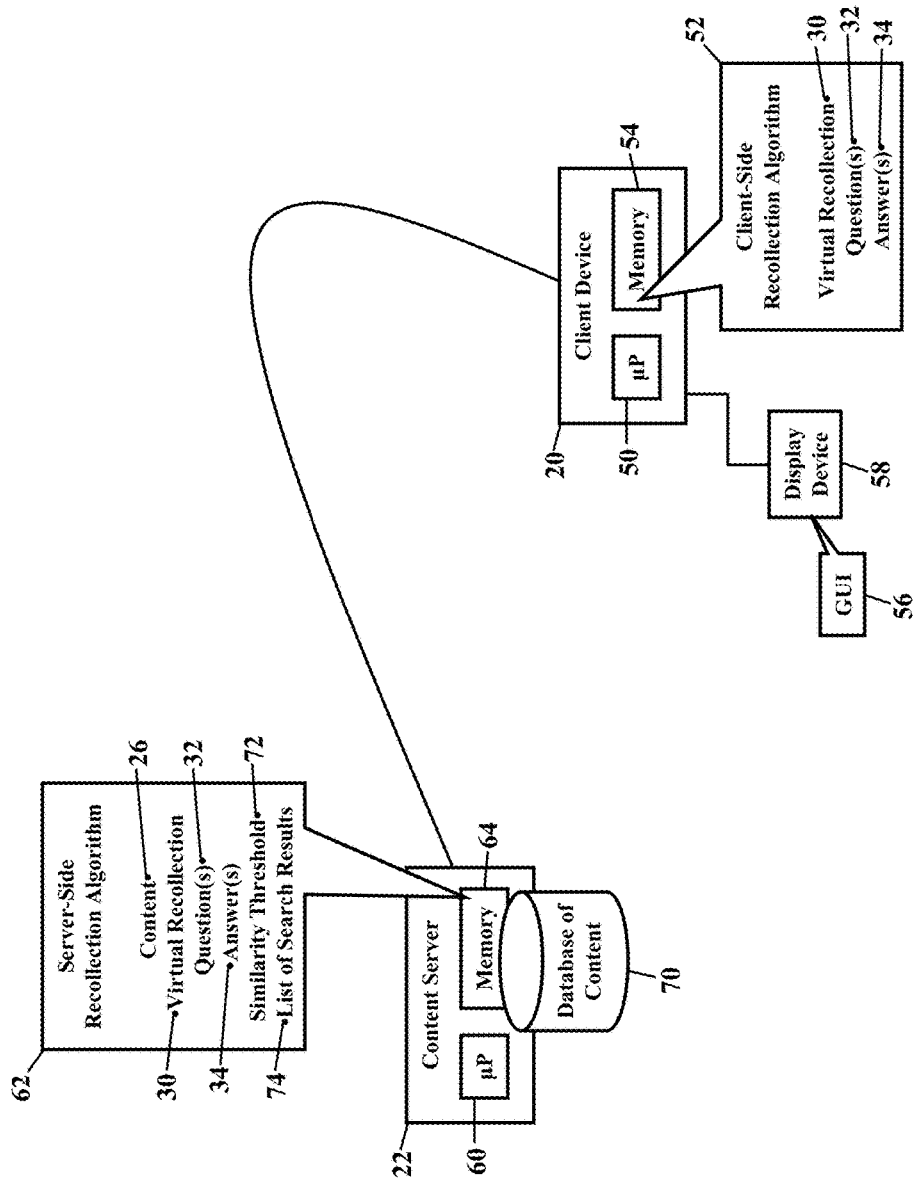
FIG. 2 is a more detailed schematic illustrating an operating environment, according to exemplary embodiments.

FIG. 2 is a more detailed schematic illustrating an operating environment, according to exemplary embodiments. Here the user's client device 20 may have a processor 50 (e.g., "pP"), application specific integrated circuit (ASIC), or other component that executes a client-side recollection algorithm 52 stored in a local memory 54. The client-side recollection algorithm 52 may cause the processor 50 to generate a graphical user interface ("GUI") 56 that is displayed on a display device 58 (such as the touch screen 38 illustrated in FIG. 1). The content server 22 may also have a processor 60 (e.g., "pP"), application specific integrated circuit (ASIC), or other component that executes a server-side recollection algorithm 62 stored in a local memory 64. The client-side recollection algorithm 52 and/or the server-side recollection algorithm 62 include instructions, code, and/or programs that cooperate in a client-server relationship to build the virtual recollection 30 from the user's answers 34 to the questions 32. The client-side recollection algorithm 52 and/or the server-side recollection algorithm 62 may cause their respective processors 50 and 60 to actually performs operations or instruct or causes another element to perform operations.

Once the user is satisfied with the virtual recollection 30, the matching content 26 may be retrieved. The virtual recollection 30 represents a digital recreation of the user's mental memory of some event. The virtual recollection 30 may thus be used to retrieve real time documentary evidence of the same event. When the virtual recollection 30 is submitted to the content server 22, the processor 60 executes a query search of a database 70 of content for the virtual recollection 30. The processor 60 may compare the virtual recollection 30 to entries in the database 70 of content. The processor 60 determines which content 26 in the database 70 of content matches the virtual recollection 30 within a similarity threshold 72. The processor 60 generates a list 74 of search results and sends the list 74 of search results to the network address associated with the client device 20. When the client device 20 audibly and/or visually presents the list 74 of search results, the user may then select and retrieve her desired content 26, as is conventionally known.

Exemplary embodiments may be applied regardless of networking environment. The communications network 24 may be a wired and/or wireless network having cellular and/or WI-FI® capabilities. The communications network 24, however, may also operate using any other frequency or standard, such as the BLUETOOTH® standard or the Internet Protocol (IP). The communications network 24, however, may be a cable network operating in the radio-frequency domain and/or the Internet Protocol (IP) domain. The communications network 24, however, may also include a distributed computing network, such as the Internet or an application of the Internet (such as cloud-based computing), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the IEEE 802 family of standards, GSM/CDMA/TDMA or any cellular standard, and/or the ISM band). The communications network 24 may even include powerline portions, in which signals are communicated via electrical wiring. The concepts described herein may be applied to any wireless/wireline communications network, regardless of physical componentry, physical configuration, or communications standard(s).

Figure 3:
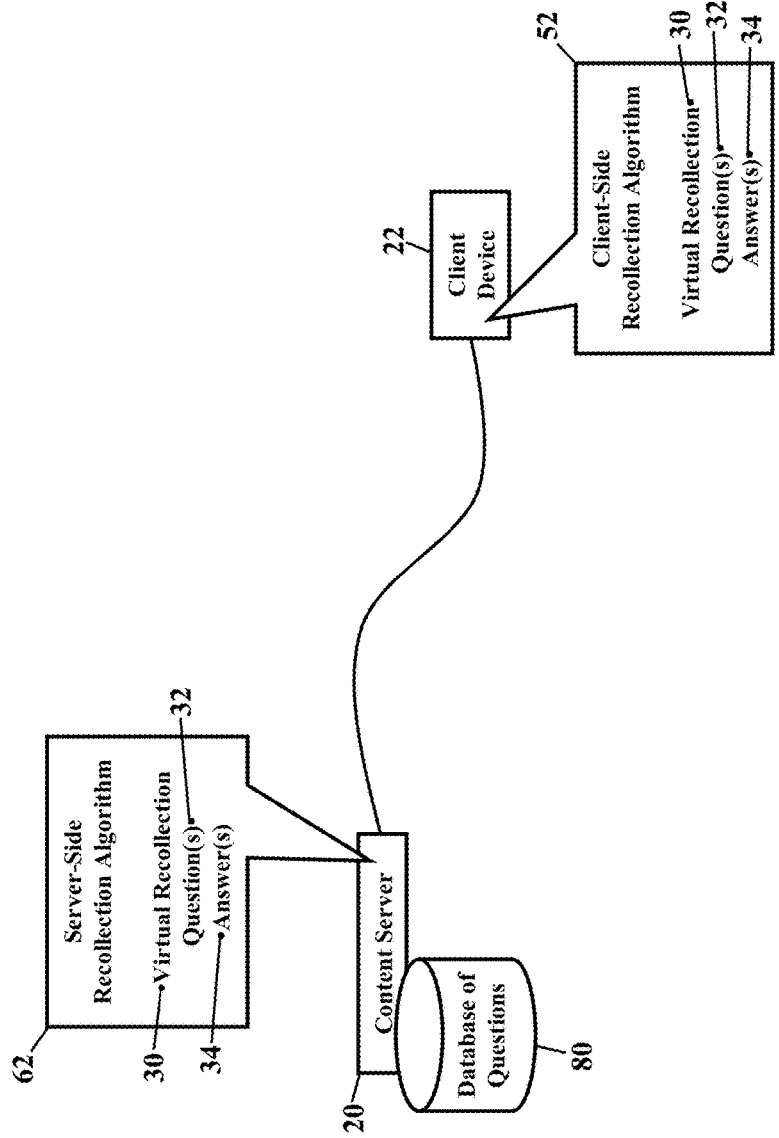
FIG. 3 is a schematic illustrating a database of questions, according to exemplary embodiments.

FIG. 3 is a schematic illustrating a database 80 of questions, according to exemplary embodiments. When the user of the client device 20 wishes to generate the virtual recollection 30, the user calls or invokes the client-side recollection algorithm 52. The user, for example, may select a graphical control or option in the graphical user interface (illustrated as reference numeral 56 in FIG. 2) to solicit the questions 32. The client-side recollection algorithm 52 accesses the database 80 of questions and retrieves one or more of the questions 32. The database 80 of questions, for example, may be a logical, hierarchical decision tree in which each answer 34 may iteratively determine the next question 32. Each answer 34 may map to another question 32 in the database 80 of questions, thus further helping jog the user's mental memory and further synthesizing the virtual recollection 30 of the user's mental memory.

Figure 4:
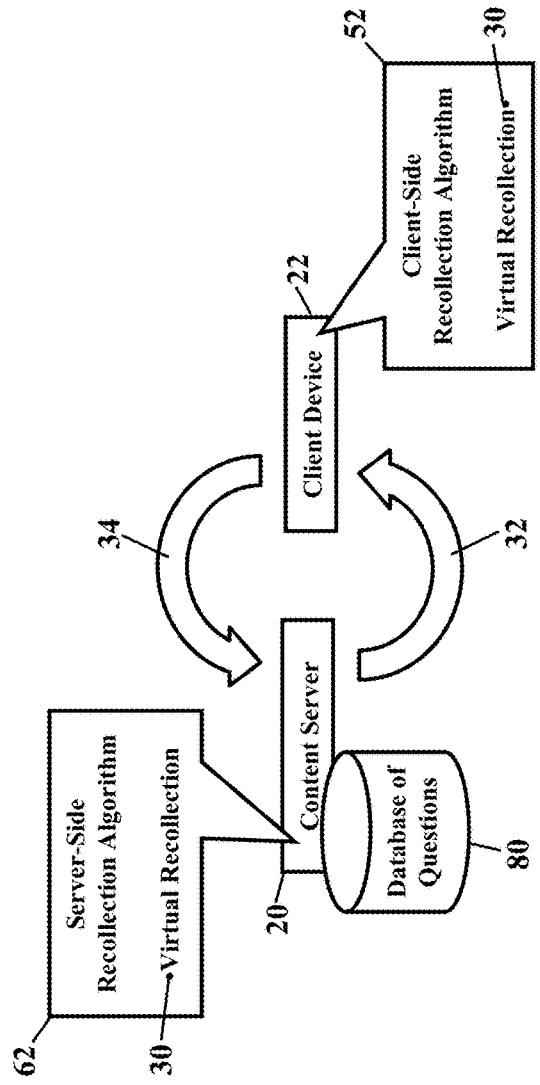
FIG. 4 is a schematic further illustrating an iterative virtual recollection, according to exemplary embodiments.

FIG. 4 is a schematic further illustrating the iterative the virtual recollection 30, according to exemplary embodiments. As each question 32 is answered, the answer 34 may be incorporated into the virtual recollection 30 of the user's mental memory. Each answer 34, in other words, may refine or add to the virtual recollection 30 displayed by the user's client device 20. Moreover, each answer 34 may also be feedback to help determine the subsequent question 32. This iterative process may continue until the user is satisfied with the detail in the virtual recollection 30 of the user's mental memory. The virtual recollection 30 is then submitted to the content server 22 as the content query 28. The database 70 of content is searched for the content 26 matching the virtual recollection 30 of the user's mental memory.

Figure 5:
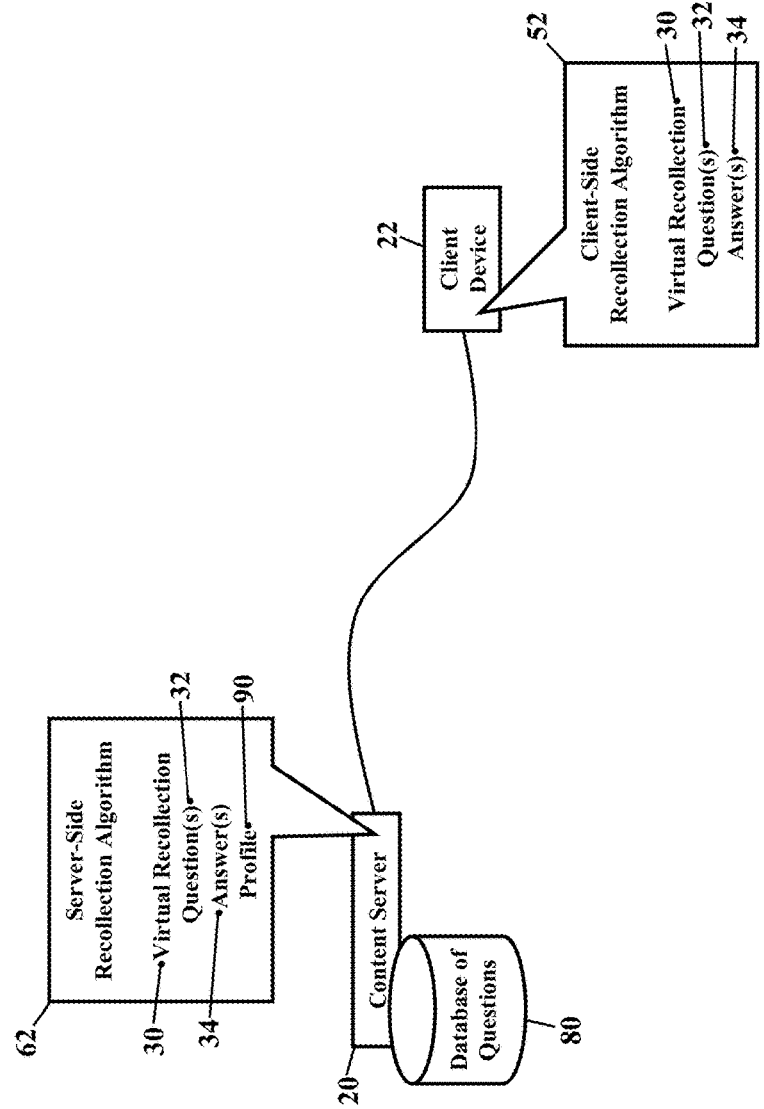
FIGS. 5-7 are schematics illustrating a profile of a user, according to exemplary embodiments.
Figure 6:
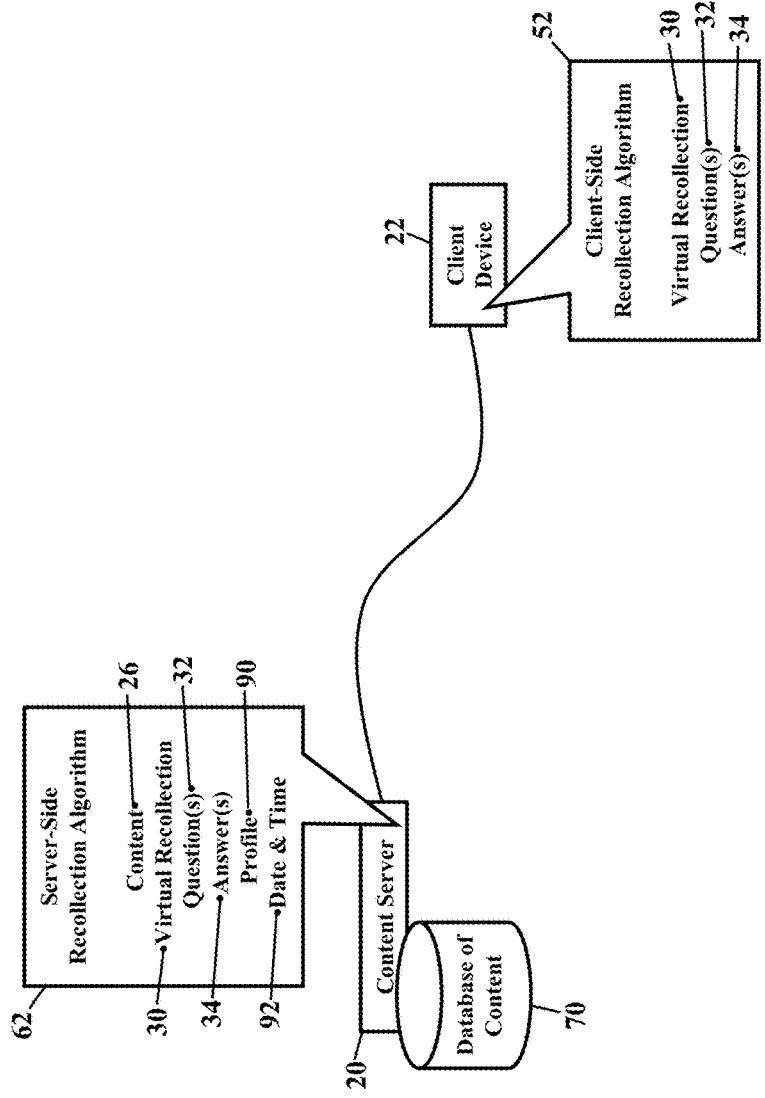
Figure 7:
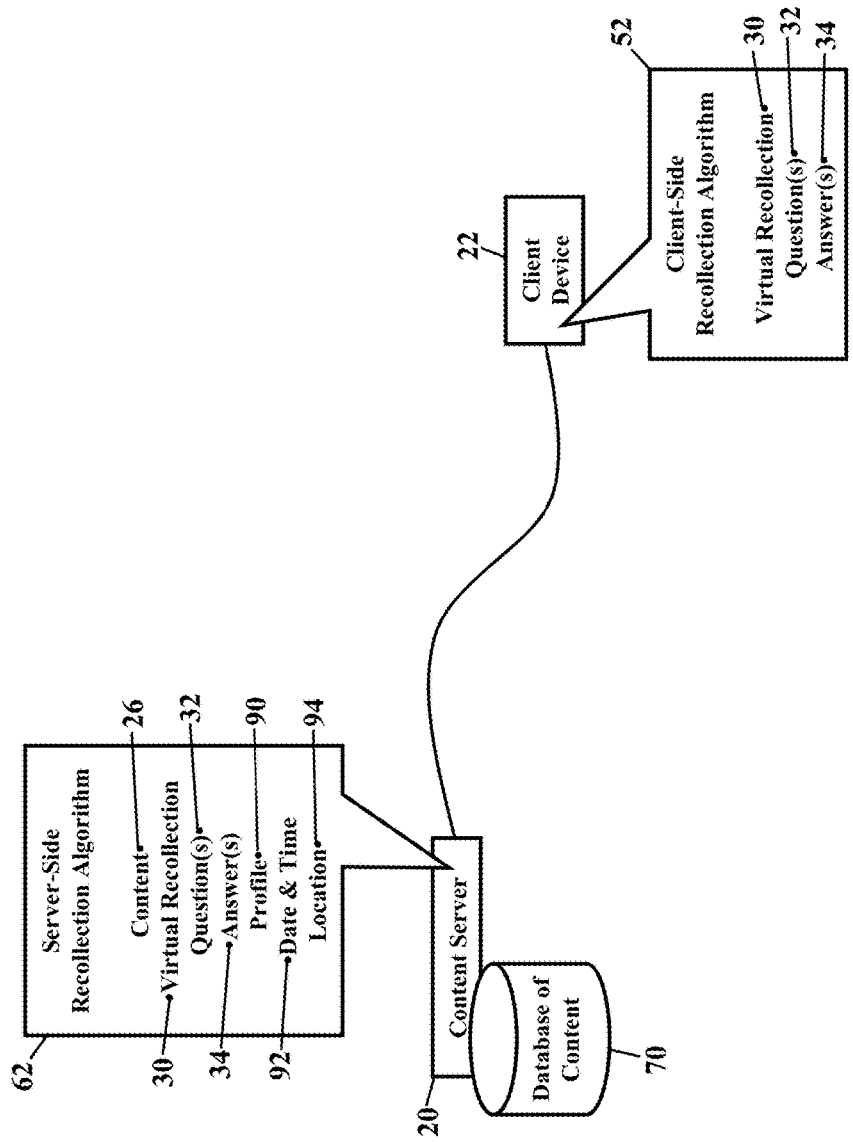

FIGS. 5-7 are schematics illustrating a profile 90 of the user, according to exemplary embodiments. As the content server 22 documents the user's daily life, the server-side recollection algorithm 62 may store and maintain the profile 90 describing any aspects associated with the user. The profile 90, for example, may contain personal information, likes, dislikes, family members, and friends. The profile 90, in particular, may contain or reference historical images associated with the user, such as digital images of family members, friends, cars, homes, and places. The profile 90 may then be consulted when adding detail to the virtual recollection 30 of the user's mental memory.

Several examples help explain incorporation of the profile 90. Suppose the user indicates her mother was involved in her fuzzy mental memory. As the virtual recollection 30 is built, the user's profile 90 may be consulted for an image of the user's mother. The mother's image may then be inserted into, or used to refine, the virtual recollection 30 of the user's mental memory. Similarly, if the user answers that she was driving her car, an image of the user's car may be incorporated into the virtual recollection 30 of the user's mental memory. If a friend was present, the friend's name may be used to incorporate an image of the friend into the virtual recollection 30. The profile 90 may thus be used to add specific details to the virtual recollection 30 of the user's mental memory. These details enhance the accuracy of the virtual recollection 30.

As FIG. 6 illustrates, the profile 90 may also add historical accuracy. As the profile 90 is built, the profile 90 may store time-period details. As the profile 90 grows over time, the entries may be tagged or associated with date and time information 92. Images and/or videos of family friends, for example, may be time-stamped for historical recall. Audio recordings may also be time-stamped for historical recall. As the database 70 of content accumulates the content 26, each content 26 may be tagged with its corresponding date and time information 92.

The date and time information 92 can be used to add period details. As the virtual recollection 30 is generated, the date and time information 92 may be used to add historical accuracy. As the user answers the questions 32, date and time information 92 may be used to retrieve time-period details from the profile 90. The profile 90, in other words, may be used to add historical details matching the time-period indicated in the user's answers. If the user needs to search for old video of years ago, the user's mental memories may be inaccurate. Exemplary embodiments, though, may consult the profile 90 for time-period details that are historically accurate. The virtual recollection 30, for example, may incorporate actual hair styles and clothing that are historically indicated in the profile 90. Actual time-period images of the user, her family, and/or her friends may be located and incorporated into the virtual recollection 30. Time-period images of the user's car, house, and furniture may also be incorporated into the virtual recollection 30. Whatever details the user can recall, the virtual recollection 30 may be synthesized to include accurate time-period information from the profile 90.

As FIG. 7 illustrates, the profile 90 may also add location accuracy. As the profile 90 is built, the profile 90 may also store location details. As the content server 22 documents the user's life, the stored content 26 may also be tagged or associated with location information 94. As the user answers the questions 32, the location information 94 may be used to retrieve location-based details from the profile 90. If the user indicates the mental memory involves some vacation location, the profile 90 may be consulted for details matching the location information 94. The virtual recollection 30 may thus incorporate vistas, scenes, and attractions associated with the same location information 94. Indeed, if the data is available, the virtual recollection 30 may also incorporate sounds and smells that further reflect the location information 94. These location-based details further add accuracy to the virtual recollection 30 of the user's mental memory.

The profile 90 may reflect both time and location accuracy. The content server 22 may tag the content 26 with both the date and time information 92 and the location information 94. The profile 90, then, may marry these accuracies to further improve the virtual recollection 30 of the user's mental memory. As the user answers the questions 32, the virtual recollection 30 may thus incorporate both time-period details and location details that match the user's profile 90.

The profile 90 may also correct faulty memories. Because the profile 90 may accurately reflect time-period and location details, the profile 90 may store an accurate historical record of the user's experiences. The profile 90 may thus be consulted to check the accuracy of the user's answers 34. If the user inputs a location that doesn't match her historical profile 90, exemplary embodiments may thus correct and/or challenge the user with the accurate, historical time and location details. When the user submits the answer 34, exemplary embodiments may query the profile 90 for the answer 34. If the answer 34 matches the profile 90, the associated time-period and location details may be retrieved and incorporated. However, if the answer 34 fails to match the profile 90, then a discrepancy may exist. The user may be challenged to change the answer 34, or the user may be prompted with a different question 32.

Figure 8:
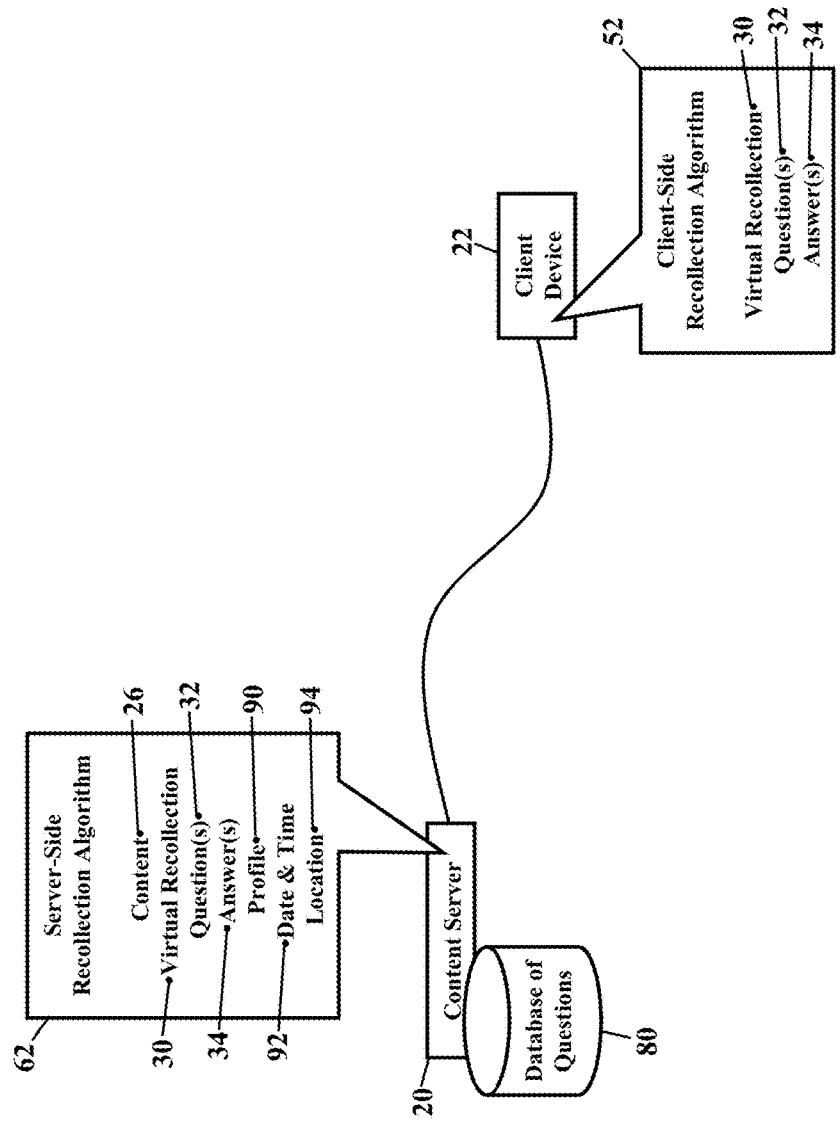
FIG. 8 is a schematic further illustrating the database of questions, according to exemplary embodiments.

FIG. 8 is a schematic further illustrating the database 80 of questions, according to exemplary embodiments. Here the profile 90 may affect what questions 32 are retrieved from the database 80 of questions. Because the profile 90 may accurately reflect time-period and location details, the profile 90 may store an accurate historical record of the user's experiences. The profile 90 may thus be consulted to determine what questions 32 are asked of the user. If the profile 90 indicates the user has never been to the beach, then perhaps there is no point in asking beach-related questions. If, during the time-period in question, the user was only located in New York City, questions 32 involving other locations may be fruitless and unrevealing. Exemplary embodiments may thus query the database 80 of questions for the date and time information 92 and/or the location information 94. The user may thus be prompted with only those questions 32 related to the date and time information 92 and/or the location information 94. The questions 32, in other words, may at least be partially confined to those relevant to historical dates and locations in the profile 90.

Figure 9:
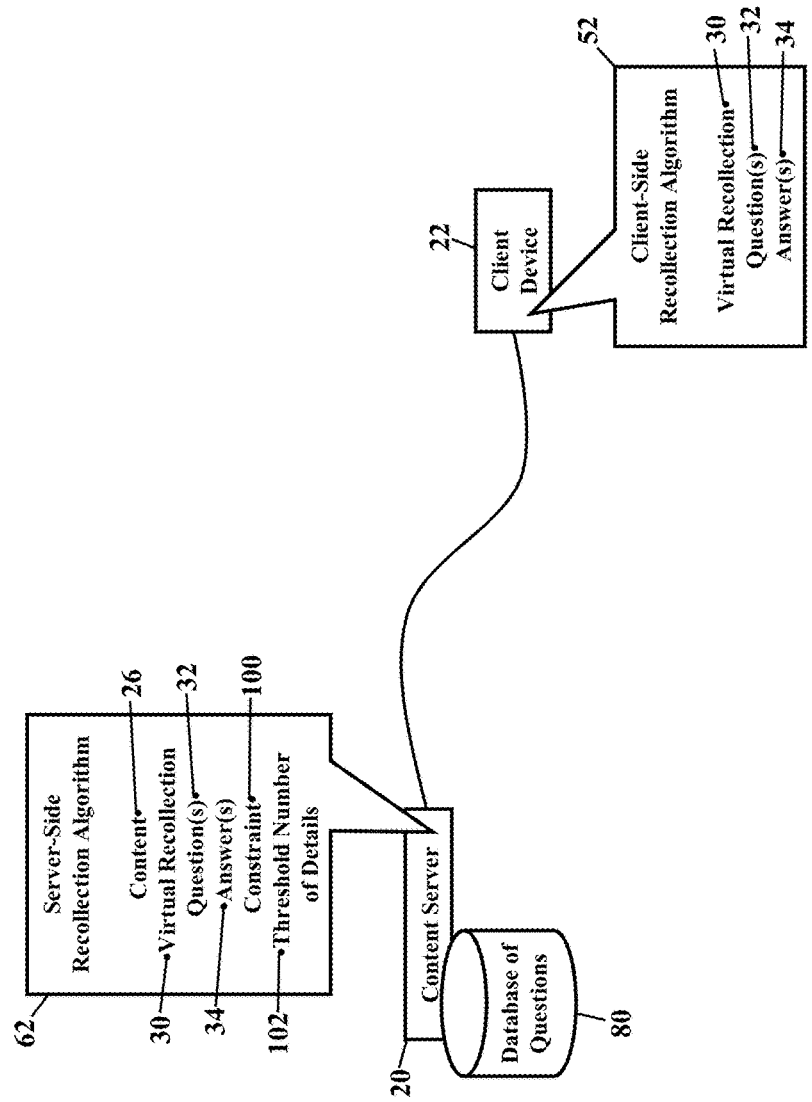
FIG. 9 is a schematic illustrating constraints, according to exemplary embodiments.

FIG. 9 is a schematic illustrating constraints 100, according to exemplary embodiments. Exemplary embodiments, in theory, could continue asking the questions 32, and receiving the user's answers 34, indefinitely. In actual practice, of course, there is perhaps one or more constraints 100 that limit or stop solicitation of the answers 34. For example, at some point the virtual recollection 30 of the mental memory is complete. As the user iteratively submits her answers 34, there may come a point at which the user is unable to recall more details. The user, in other words, may have exhausted her ability to recall details, thus making fruitless further questions 32 and answers 34.

Another constraint 100 may be time. Construction of the virtual recollection 30 will require the user's time, especially to synthesize an accurate memory. Sometimes, of course, the user only has a limited amount of time in which to complete the virtual recollection 30 of the mental memory. Many users, for example, may become frustrated or lose interest after several minutes. Exemplary embodiments, then, may iteratively consult the profile 90 and the database 80 of questions to develop, as quickly as possible, the virtual recollection 30 of the mental memory.

The constraint 100 may also be hardware and memory resources. As the virtual recollection 30 of the mental memory grows in detail, the content server 22 may have more difficulty in finding a match. That is, more processing and memory resources are consumed, perhaps for a longer time. Exemplary embodiments, then, may impose a computational limit on the detail, or complexity, of the virtual recollection 30 of the mental memory. For example, actual practice may reveal that beyond a threshold number 102 of details, the search results plateau or even diminish. That is, a more complex virtual recollection 30 does not necessarily produce narrower search results. Exemplary embodiments, then, may enforce the threshold number 102 of details in the virtual recollection 30 of the mental memory. Each color and each object (e.g., a face, furniture, or car) may be considered a detail. Even a sound may also be considered a separate detail. Indeed, exemplary embodiments may consider each answer 34 a separate detail which is incorporated into, or added to, the virtual recollection 30 of the mental memory. The details in the virtual recollection 30 of the mental memory may be summed and compared to the threshold number 102 of details. When the number of details equals or exceeds the threshold number 102 of details, exemplary embodiments may stop or halt further questions 32. The content server 22 then searches the database 70 of content for the current rendition of the virtual recollection 30 of the mental memory.

Figure 10:
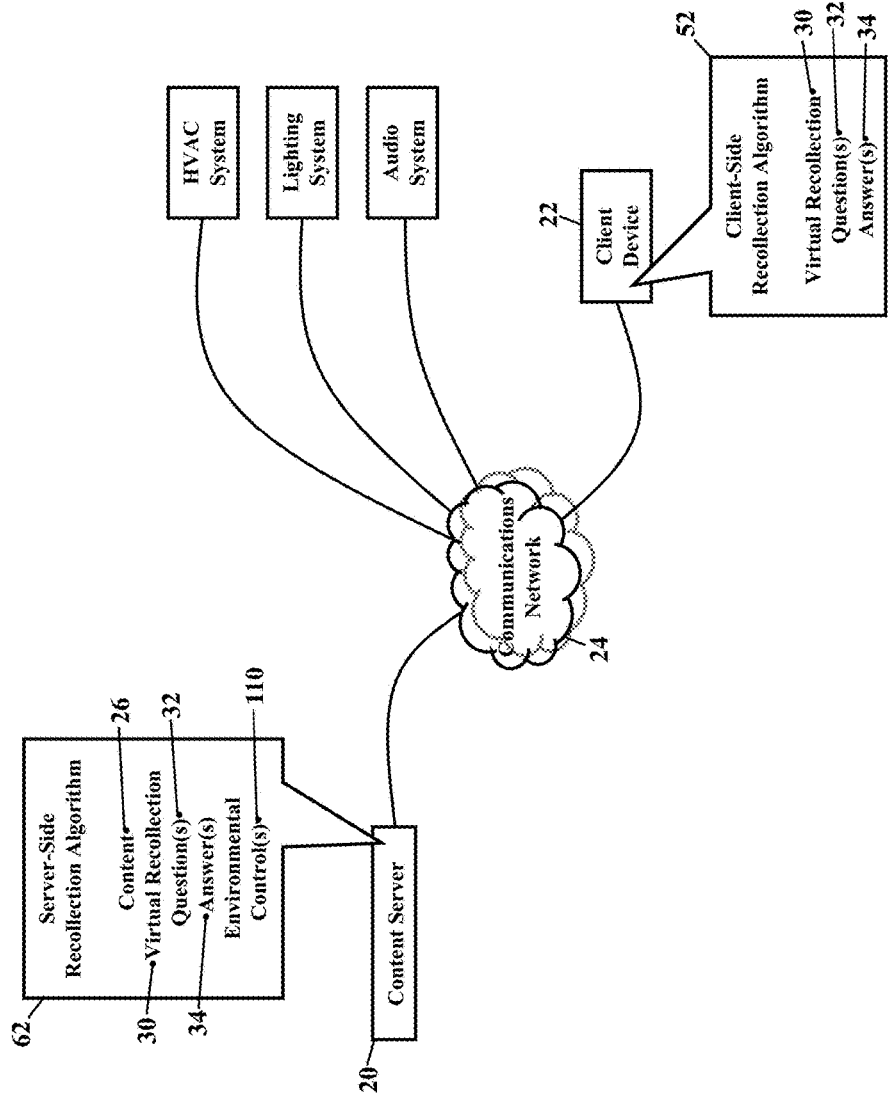
FIG. 10 is a schematic illustrating environmental controls, according to exemplary embodiments.

FIG. 10 is a schematic illustrating environmental controls 110, according to exemplary embodiments. Exemplary embodiments ask the questions 32, and incorporate the answers 34, to jog the user's mental memory and to create the virtual recollection 30 of the mental memory. Sometimes environmental conditions may also help jog the user's mental memory. For example, a temperature of a room may help jog the user's mental memory. If the user is trying to recall a winter moment, perhaps a colder room temperature may help recall further memories. Similarly, lighting in the room may be darkened to help recall details of a nighttime memory. Beach sounds (e.g., waves and seagulls) may help recall beach memories. The client-side recollection algorithm 52 and/or the server-side recognition algorithm 62 may thus individually or cooperatively generate the environmental controls 110 to adjust ambient conditions. As FIG. 10 illustrates, the client-side recollection algorithm 52 and/or the server-side recognition algorithm 62 may interface with an HVAC system 112. The environmental controls 110 may instruct, command, or cause the HVAC system 112 to adjust temperature, humidity, or other ambient condition. The client-side recollection algorithm 52 and/or the server-side recognition algorithm 62 may also send the environmental controls 110 to a lighting system 114 to adjust lights and window coverings. An audio system 116 may also be instructed to pick and play some audio track. These environmental conditions may help jog the user's mental memory.

Figure 11:
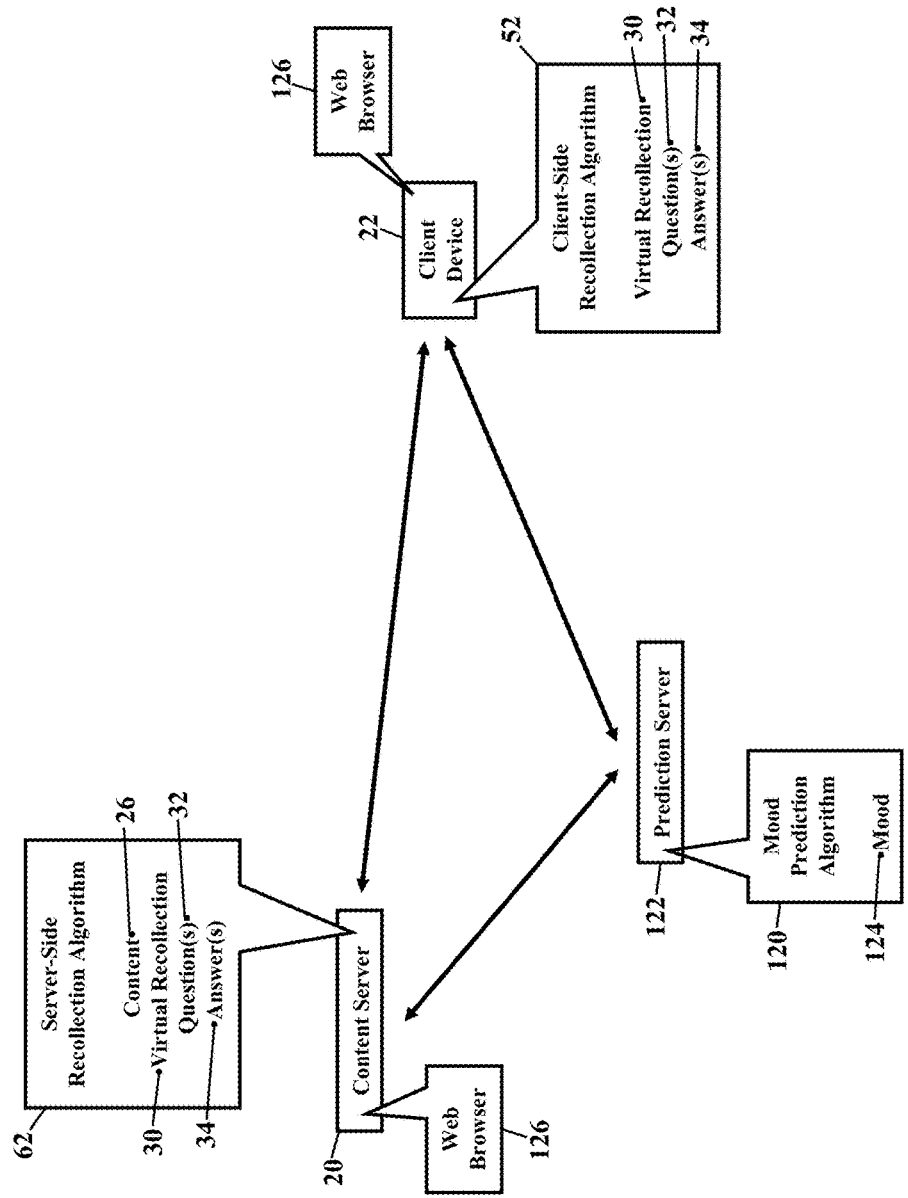
FIG. 11 is a schematic illustrating mood resolution, according to exemplary embodiments.

FIG. 11 is a schematic illustrating mood resolution, according to exemplary embodiments. Because exemplary embodiments can help the user visualize her memories, exemplary embodiments may also predict and counter the user's moods. As the user answers the questions 32, the client-side recollection algorithm 52 and/or the server-side recognition algorithm 62 may call or invoke a mood prediction algorithm 120. FIG. 11 illustrates the mood prediction algorithm 120 being stored in memory of a prediction server 122, yet the mood prediction algorithm 120 may be a software component of the client-side recollection algorithm 52 and/or the server-side recognition algorithm 62. Regardless, as the user answers the questions 32, the questions 32 and the answers 34 may be sent to the mood prediction algorithm 120 for analysis. The mood prediction algorithm 120 may thus predict the user's mood 124 based on the questions 32 and/or the answers 34.

Once the user's mood 124 is predicted, actions may be taken based on the mood 124. The content server 22, for example, may be instructed to retrieve the content 26 that matches the user's predicted mood 124. If the user's predicted mood 124 is "happy," the content server 22 may retrieve additional family and vacation videos tagged as "happy" moments. Moreover, an advertising server, as another example, may target advertisements to the client device 22 that are related to the predicted mood 124.

A contrary mood 124 may be important. Sometimes the user's predicted mood 124 may require intervention. If the user's predicted mood 124 is "sad," for example, the content server 22 may be instructed to retrieve contrary memories. That is, the content server 22 queries for and retrieves "happy" videos of happy memories. The "happy" videos may thus be sent to and played by the user's client device 20 to uplift the user's spirits.

The user's predicted mood 124 may also be used as a search query for a web browser 126. Once the user's mood 124 is predicted, queries may be sent to search engines for other content related to, or contrary to, the user's predicted mood 124. Web content may thus be retrieved that complements, or is contrary to, the user's predicted mood 124.

Figure 12:
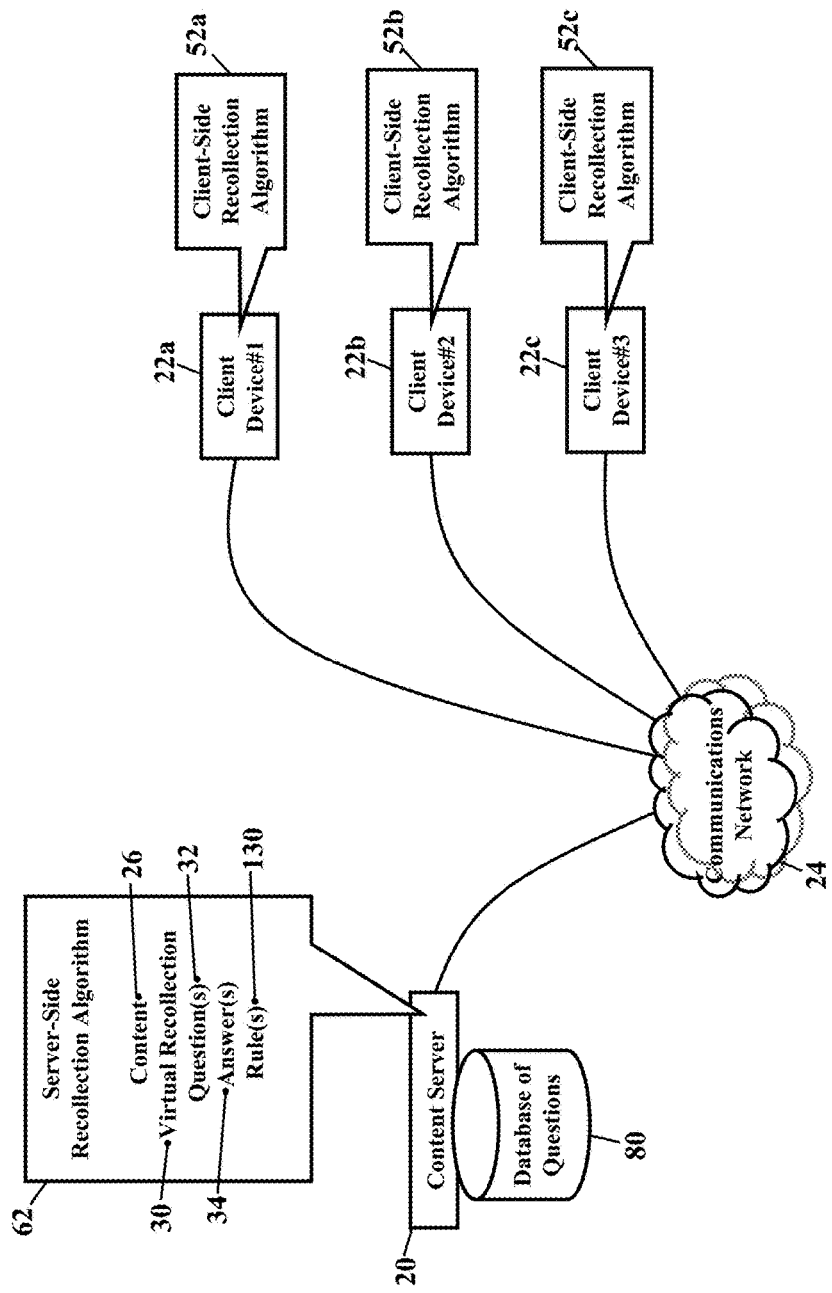
FIG. 12 is a schematic illustrating collaborative synthesis, according to exemplary embodiments.

FIG. 12 is a schematic illustrating collaborative synthesis, according to exemplary embodiments. Here multiple client devices (illustrated as reference numerals 22a-c) may collaboratively synthesize the virtual recollection 30 of the mental memory. As FIG. 12 illustrates, the multiple client devices 22a-c may each store and execute the client-side recollection algorithm 52a-c. When the multiple client devices 22a-c all wish to synthesize the same virtual recollection 30, the peer client devices 22a-c may all be asked the same, or different, questions 32 from the database 80 of questions. The answers 34 from the multiple client devices 22a-c may be sent to the content server 22, and the server-side recognition algorithm 62 may merge each answer 34 into the common virtual recollection 30. Indeed, if each client device 22a-c is asked a different question 32, the virtual recollection 30 may be more quickly synthesized from the different answers 34. The virtual recollection 30, in other words, may be a composite of the answers 34 from the multiple client devices 22a-c. However, of course, people remember the same things in different ways, so some details in the common virtual recollection 30 may differ or even be contradictory. Should two or more details contradict, exemplary embodiments may impose resolution rules 130. For example, one of the contradictory details may simply be discarded or ignored to resolve the conflict. Conflicting colors may both be ignored, as color is unlikely to narrow search results. Other conflicting details may be resolved by querying the respective user's profile 90 for the date and time information 92 and/or the location information 92. If a person's profile 90 contradicts their answer 34, exemplary embodiments may ignore that answer 34.

Figure 13:
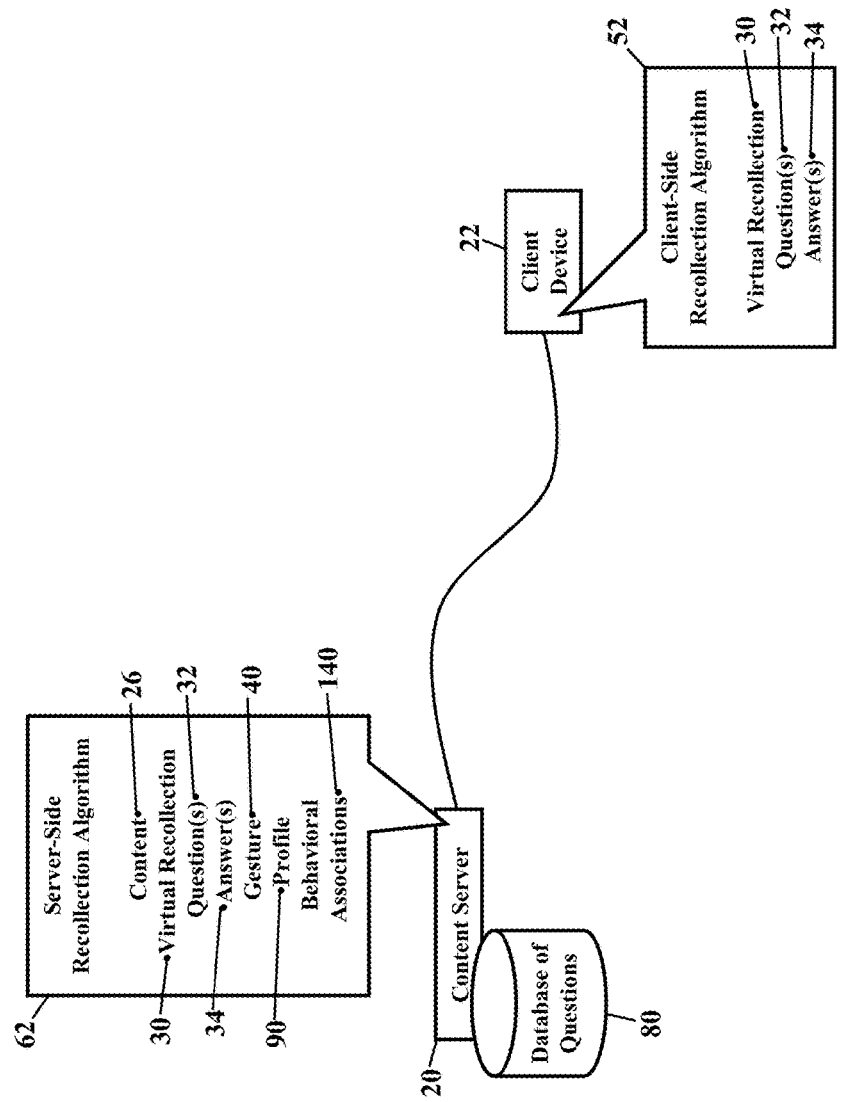
FIG. 13-14 are schematics illustrating behavioral prediction, according to exemplary embodiments.
Figure 14:
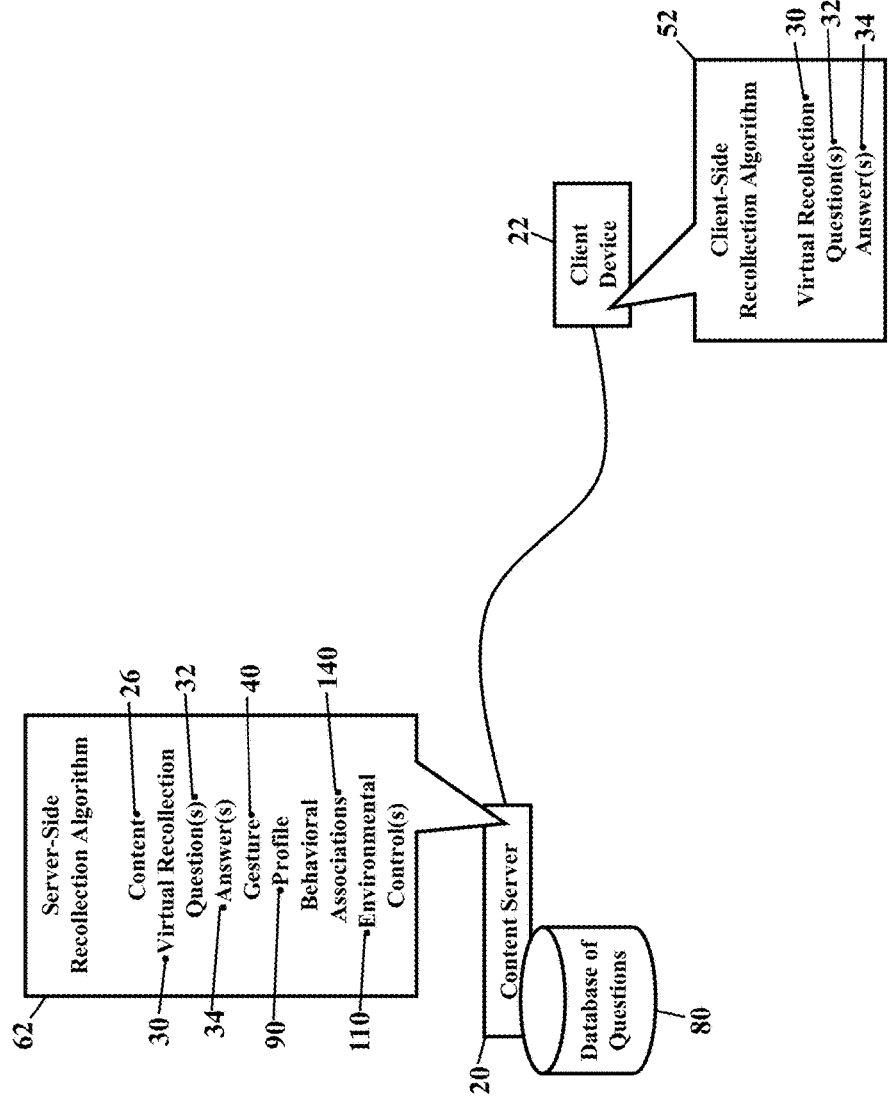

FIG. 13-14 are schematics illustrating behavioral prediction, according to exemplary embodiments. Here exemplary embodiments may predict and insert habitual activities. As the server-side recognition algorithm 62 synthesizes the user's virtual recollection 30 of the mental memory, the server-side recognition algorithm 62 may automatically insert video, images, and/or audio of habitual behavior. Suppose, for example, the user inputs the gesture 40 of drinking coffee (as earlier paragraphs explained). When the user's profile 90 is queried, the user's profile 90 may relate morning coffee with television news. That is, the user's profile 90 may store behavioral associations 140 that indicate the user always watches the morning news while drinking coffee. The behavioral associations 140 may thus be activities or objects that are historically and/or habitually observed to accompany some input or answer 34. So, when the user inputs the gesture 40 of drinking coffee, exemplary embodiments may also insert photos or images of a television or computer. These behavioral associations 140 may thus be synthesized into the virtual recollection 30 to further jog the user's mental memory.

FIG. 14 illustrates physical execution of the behavioral associations 140. When the behavioral associations 140 are retrieved from the user's profile 90, exemplary embodiments may implement those behavioral associations 140. As earlier paragraphs explained, for example, the environmental controls 110 may be used to adjust temperature, lighting, and audio. If the user regularly enjoys morning news with her coffee, exemplary embodiments may activate a computer, television, or audio device to play a news source. The environmental controls 110 may thus instruct a computer or tuner to retrieve a news channel or website while coffee is enjoyed. The behavioral associations 140 may thus be physically executed for convenience of the user.

Figure 15:
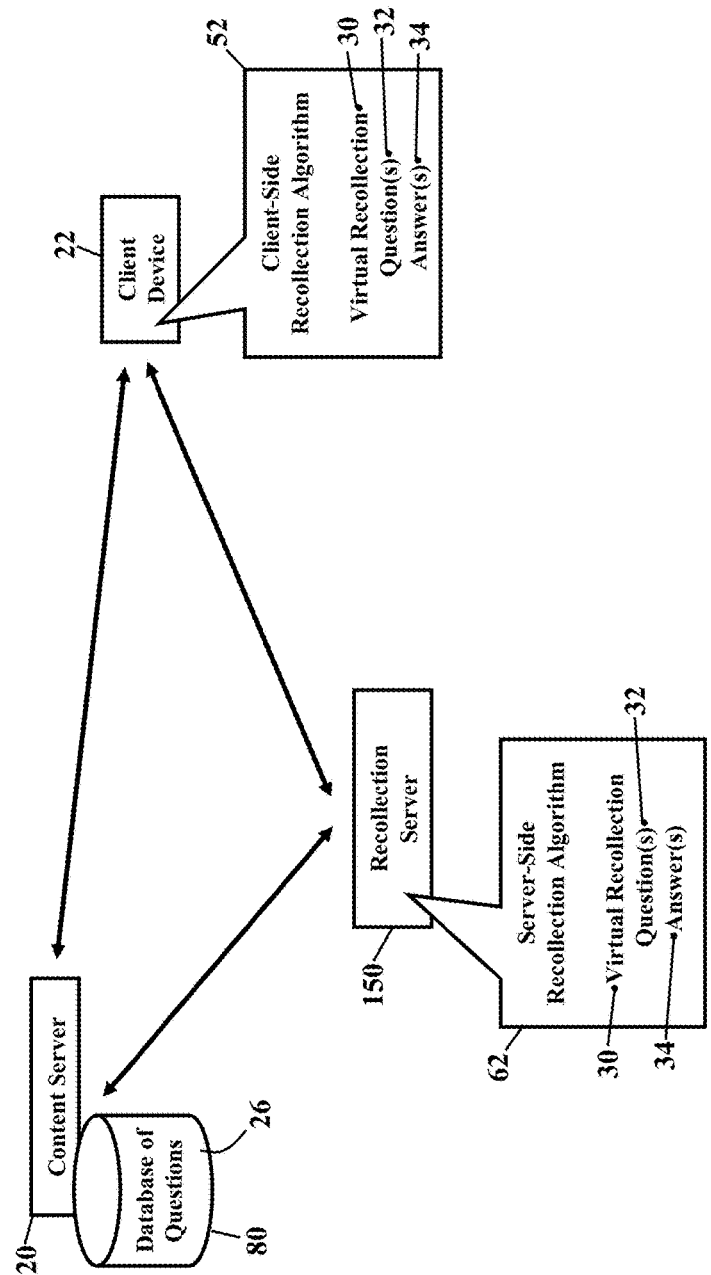
FIG. 15 is a schematic illustrating a recollection server, according to exemplary embodiments.

FIG. 15 is a schematic illustrating recollection server 150, according to exemplary embodiments. Here the recollection server 150 stores and executes the server-side recognition algorithm 62 to construct the virtual recollection 30 of user's mental memory. The recollection server 150 thus relieves the content server 22 from the burdens of generating the virtual recollection 30. The content server 22 may thus concentrate on content storage and retrieval, and the recollection server 150 builds the virtual recollection 30 of user's mental memory. The recollection server 150 prompts the user's client device 20 with the questions 32, and the user responds with her answers 34. Once the virtual recollection 30 is complete, the recollection server 150 may thus query the database 80 of content to retrieve the content 26 matching the virtual recollection 30.

Figure 16:
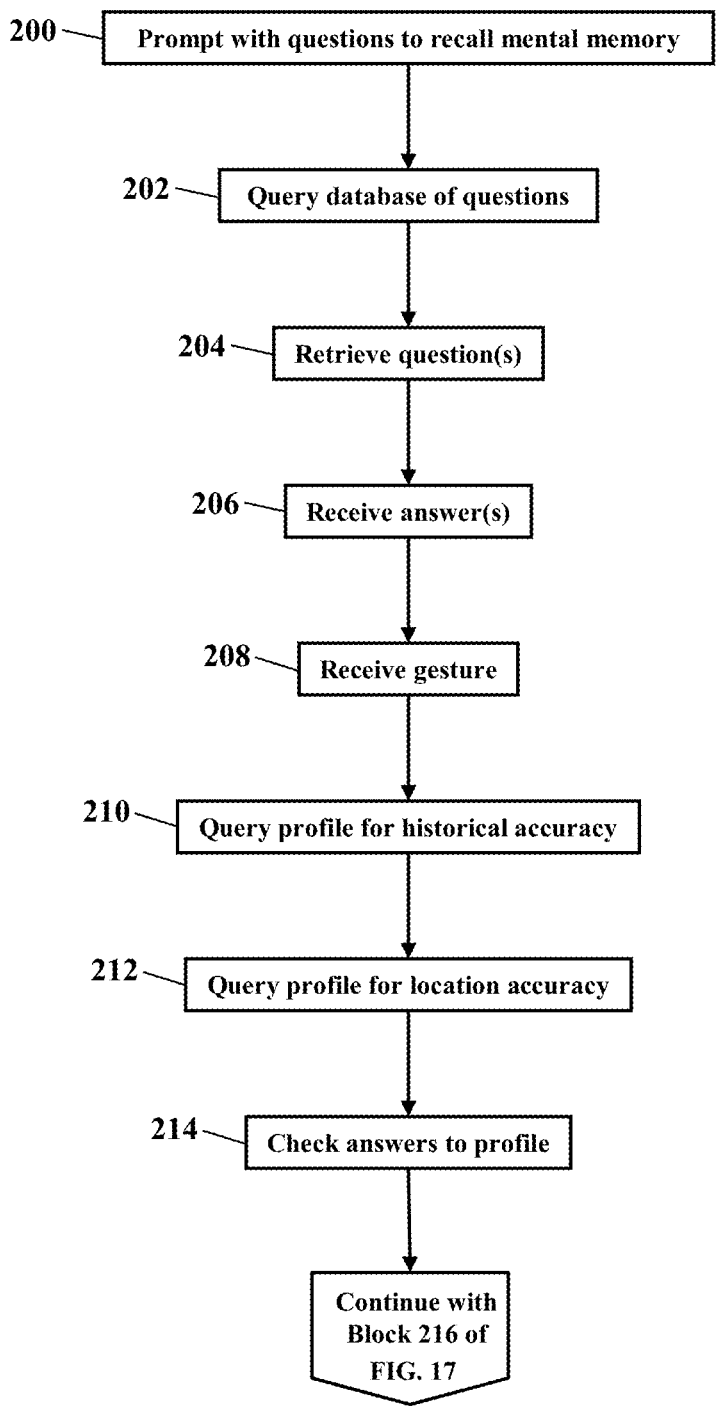
FIGS. 16-18 are flowcharts illustrating a method or algorithm for authenticating users, according to exemplary embodiments.
Figure 17:
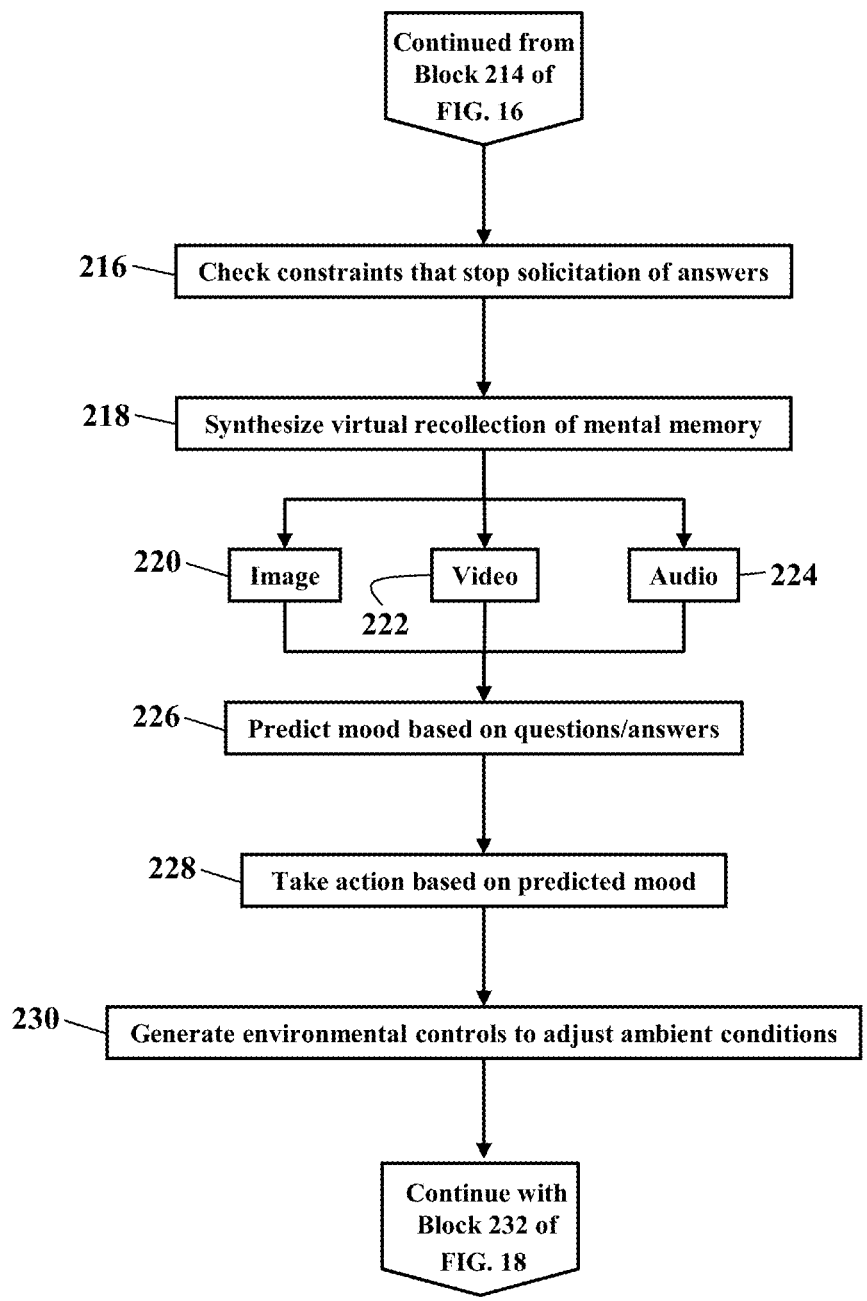
Figure 18:
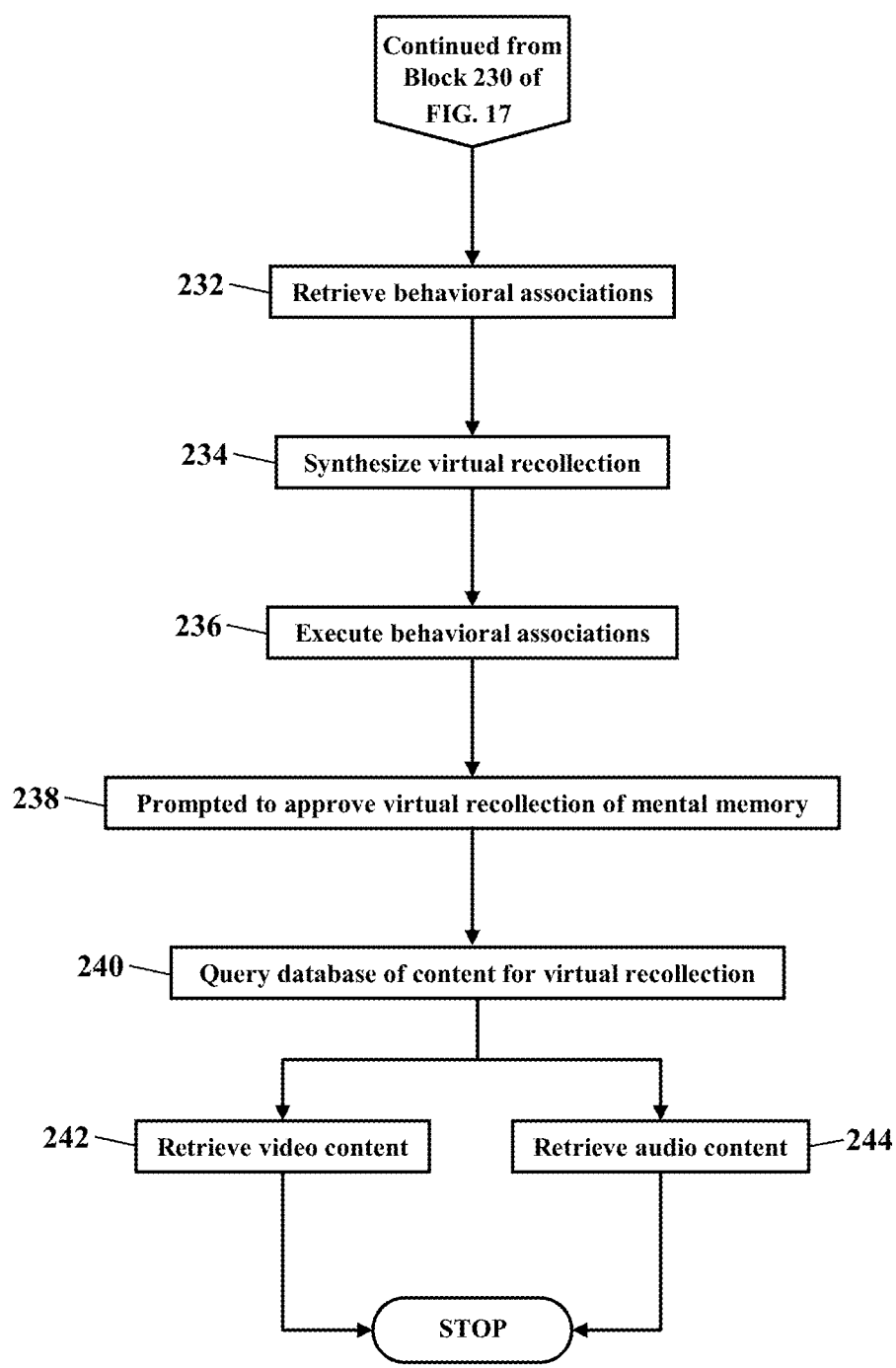

FIGS. 16-18 are flowcharts illustrating a method or algorithm for authenticating users, according to exemplary embodiments. The user of the client device 20 is prompted with the questions 32 to recall a mental memory (Block 200). The database 80 of questions is queried (Block 202) and one or more of the questions 32 are retrieved (Block 204). The answers 34 are received (Block 206). The gesture 40 may also be received as an answer 34 (Block 208). The profile 90 may be queried for historical accuracy (Block 210) and location accuracy (Block 212). Check accuracy of the answers 34 to the profile 90 (Block 214).

The algorithm continues with FIG. 17. The constraints 100 are checked that limit or stop solicitation of the answers 34 (Block 216). The virtual recollection 30 of the user's mental memory is synthesized (Block 218). The virtual recollection 30 may be synthesized as an image (Block 220), video (Block 222), and/or audio (Block 224). The user's mood 124 may be predicted based on the questions 32 and/or the answers 34 (Block 226). Actions may be taken based on predicted mood (Block 228). The environmental controls 110 may be generated to adjust ambient conditions (Block 230).

The algorithm continues with FIG. 18. The behavioral associations 140 are retrieved (Block 232) and synthesized into the virtual recollection 30 (Block 234). The behavioral associations 140 are executed (Block 236). The client device 20 may be prompted to approve the virtual recollection 30 of the user's mental memory (Block 238). The database 70 of content is queried for the virtual recollection 30 of the mental memory (Block 240). Video content (Block 242) and audio content (Block 244) may be retrieved that matches the virtual recollection 30 of the mental memory.

Figure 19:
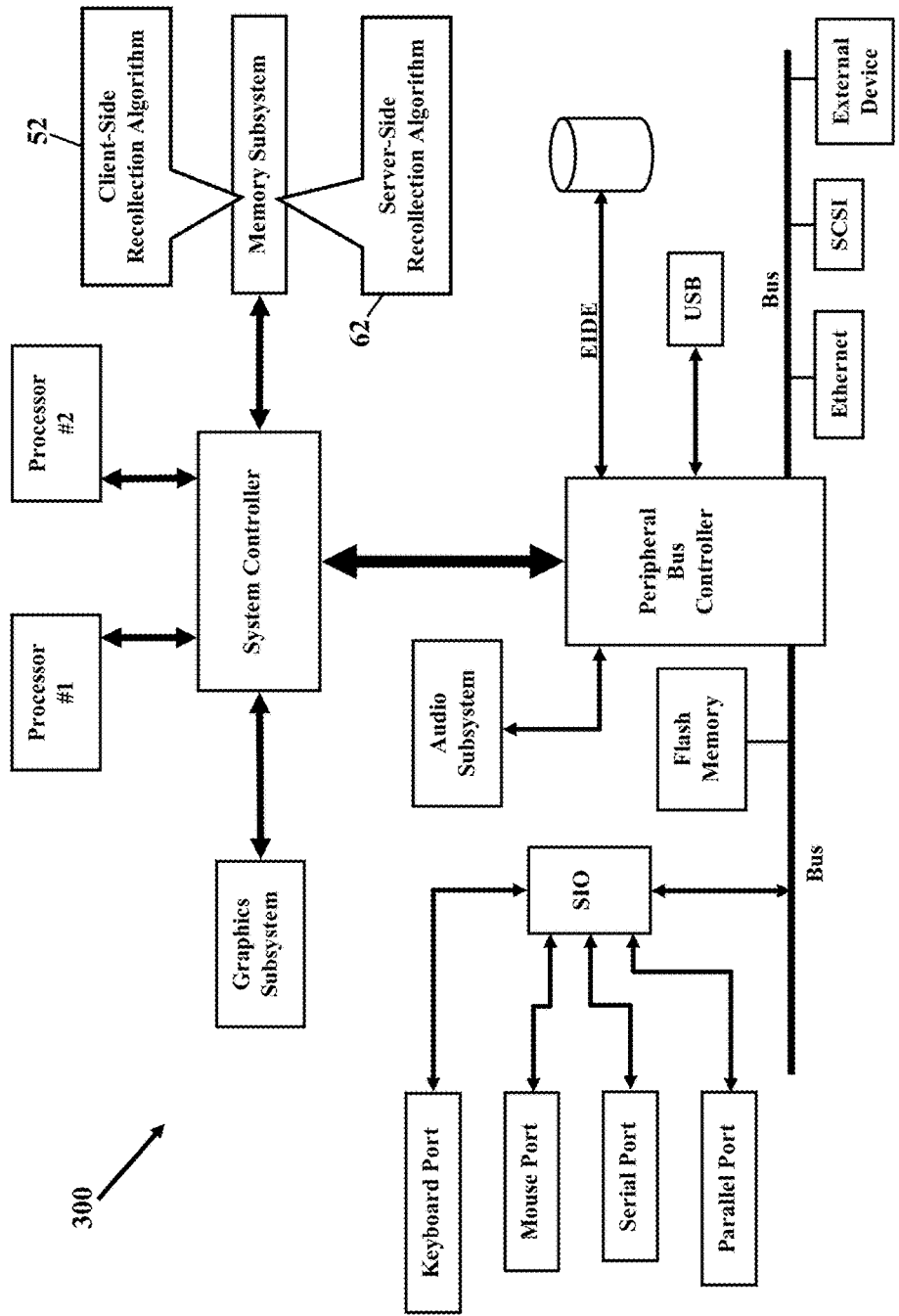
FIGS. 19-20 depict still more operating environments for additional aspects of the exemplary embodiments.

FIG. 19 is a schematic illustrating still more exemplary embodiments. FIG. 31 is a more detailed diagram illustrating a processor-controlled device 300. As earlier paragraphs explained, the client-side recognition algorithm 52 and/or the server-side recognition algorithm 62 may operate in any processor-controlled device. FIG. 19, then, illustrates the client-side recognition algorithm 52 and/or the server-side recognition algorithm 62 stored in a memory subsystem of the processor-controlled device 300. One or more processors communicate with the memory subsystem and execute either or both applications. Because the processor-controlled device 300 is well-known to those of ordinary skill in the art, no further explanation is needed.

Figure 20:
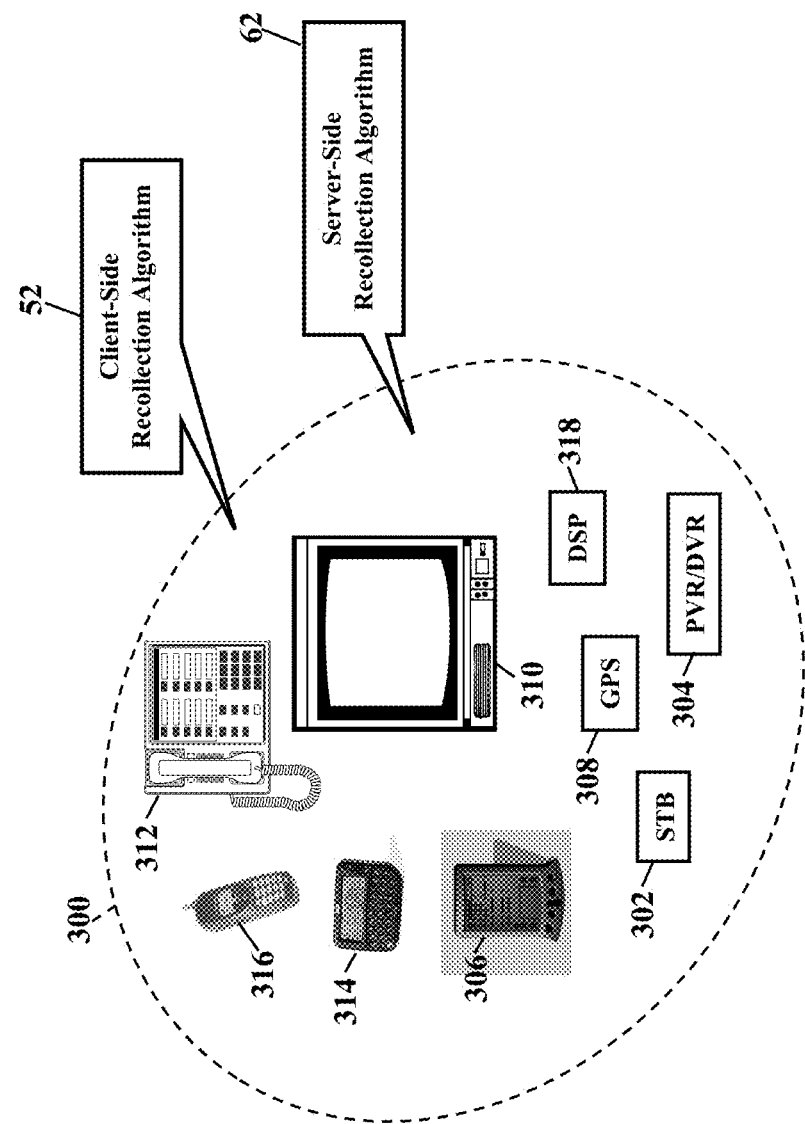

FIG. 20 depicts still more operating environments for additional aspects of the exemplary embodiments. FIG. 20 illustrates that the exemplary embodiments may alternatively or additionally operate within other processor-controlled devices 300. FIG. 20, for example, illustrates that the client-side recognition algorithm 52 and/or the server-side recognition algorithm 62 may entirely or partially operate within a set-top box ("STB") (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system, communications device, or any processor-controlled device utilizing a digital signal processor (DP/DSP) 318. The processor-controlled device 300 may also include watches, radios, vehicle electronics, clocks, printers, gateways, mobile/implantable medical devices, and other apparatuses and systems. Because the architecture and operating principles of the various processor-controlled devices 300 are well known, the hardware and software componentry of the various processor-controlled devices 300 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for recalling memories to retrieve documentary evidence of those memories, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   receiving, by a server, electronic answers associated with a client device, the electronic answers responsive to electronic questions;
   querying, by the server, an electronic profile for the electronic answers, the electronic profile electronically associating digital objects to the electronic answers;
   retrieving, by the server, the digital objects that are electronically associated by the electronic profile with the electronic answers; and
   generating, by the server, a digital image that incorporates information associated with the digital objects.

2. The method of claim 1, further comprising sending the electronic questions to the client device, the electronic questions eliciting the electronic answers for the generating of the digital image.

3. The method of claim 1, further comprising retrieving a digital object of the digital objects.

4. The method of claim 1, further comprising displaying the digital image.

5. The method of claim 1, further comprising querying an electronic database of content for the digital image.

6. The method of claim 5, further comprising determining a match between the digital image and an entry in the electronic database of content.

7. The method of claim 6, further comprising retrieving a video file in response to the match.

8. The method of claim 6, further comprising retrieving an image file in response to the match.

9. The method of claim 6, further comprising retrieving an audio file in response to the match.

10. The method of claim 1, further comprising determining a count of the digital objects that are electronically associated with the electronic answers.

11. A system, comprising:
    a hardware processor; and
    a memory device, the memory device storing instructions, the instructions when executed causing the hardware processor to perform operations, the operations comprising:
    receiving electronic answers associated with a client device, the electronic answers responsive to electronic questions;
    querying an electronic profile based on the electronic answers, the electronic profile electronically associating digital objects to the electronic answers;
    identifying the digital objects referenced by the electronic profile that are electronically associated with the electronic answers; and
    generating a digital image that incorporates information associated with the digital objects.

12. The system of claim 11, wherein the operations further comprise sending the electronic questions to the client device, the electronic questions eliciting the electronic answers for the generating of the digital image.

13. The system of claim 11, wherein the operations further comprise retrieving a digital object of the digital objects.

14. The system of claim 11, wherein the operations further comprise displaying the digital image.

15. The system of claim 11, wherein the operations further comprise querying an electronic database of content for the digital image.

16. The system of claim 15, wherein the operations further comprise determining a match between the digital image and an entry in the electronic database of content.

17. A memory device storing instructions that when executed cause a hardware processor to perform operations, the operations comprising:
    receiving electronic answers associated with a client device, the electronic answers responsive to electronic questions;
    querying an electronic profile based on the electronic answers, the electronic profile electronically associating digital objects to the electronic answers;
    accessing the digital objects that are electronically associated by the electronic profile with the electronic answers; and generating a digital image that incorporates information associated with the digital objects.

18. The memory device of claim 17, wherein the operations further comprise sending the electronic questions to the client device, the electronic questions eliciting the electronic answers for the generating of the digital image.

19. The memory device of claim 17, wherein the operations further comprise retrieving a digital object of the digital objects.

20. The memory device of claim 17, wherein the operations further comprise displaying the digital image.

* * * * *